United States Patent [19]
Stains

[11] 3,793,762
[45] Feb. 26, 1974

[54] LOW VOLUME INSECTICIDE AEROSOL GENERATOR

[76] Inventor: George S. Stains, 45-655 Mohawk Cir., Indian Wells, Calif. 92260

[22] Filed: July 2, 1971

[21] Appl. No.: 159,318

Related U.S. Application Data

[62] Division of Ser. No. 8,574, Feb. 4, 1970, Pat. No. 3,648,401.

[52] U.S. Cl. ................................................. 43/124
[51] Int. Cl. .............................................. A01m 7/00
[58] Field of Search ............. 43/131, 129, 124, 125; 424/225; 252/359; 261/78, 35, 115; 239/77, 78, 135

[56] References Cited
UNITED STATES PATENTS
3,239,960  3/1966  Stevens ............................. 43/129
3,200,535  8/1965  Hession, Jr. ....................... 43/129
3,636,207  1/1972  Bouvet et al. ..................... 43/131
2,971,882  2/1961  Ospenson et al. ................. 424/225
3,595,958  7/1971  Koundakjian et al. ............. 424/225
3,630,446  12/1971  Strengelbach et al. ............ 43/131

Primary Examiner—Warner H. Camp
Attorney, Agent, or Firm—R. S. Sciascia; Charles D. B. Curry

[57] ABSTRACT

A method of producing an insecticide spray for killing insects with droplets in the size range of from about 5 microns to about 15 microns. The spray consists of an insecticide, such as Naled-14, diluted with a non-volatile liquid, such as cottonseed oil, in a ratio of 1 to 4 by volume. The aerosol generating equipment includes an engine driven blower supplying air at about 450 cubic feet per minute at a pressure of about 4 psi. This air is supplied to a group of four air-liquid double vortical nozzles that atomizes the insecticide into the 5 to 15 micron size range.

5 Claims, 2 Drawing Figures

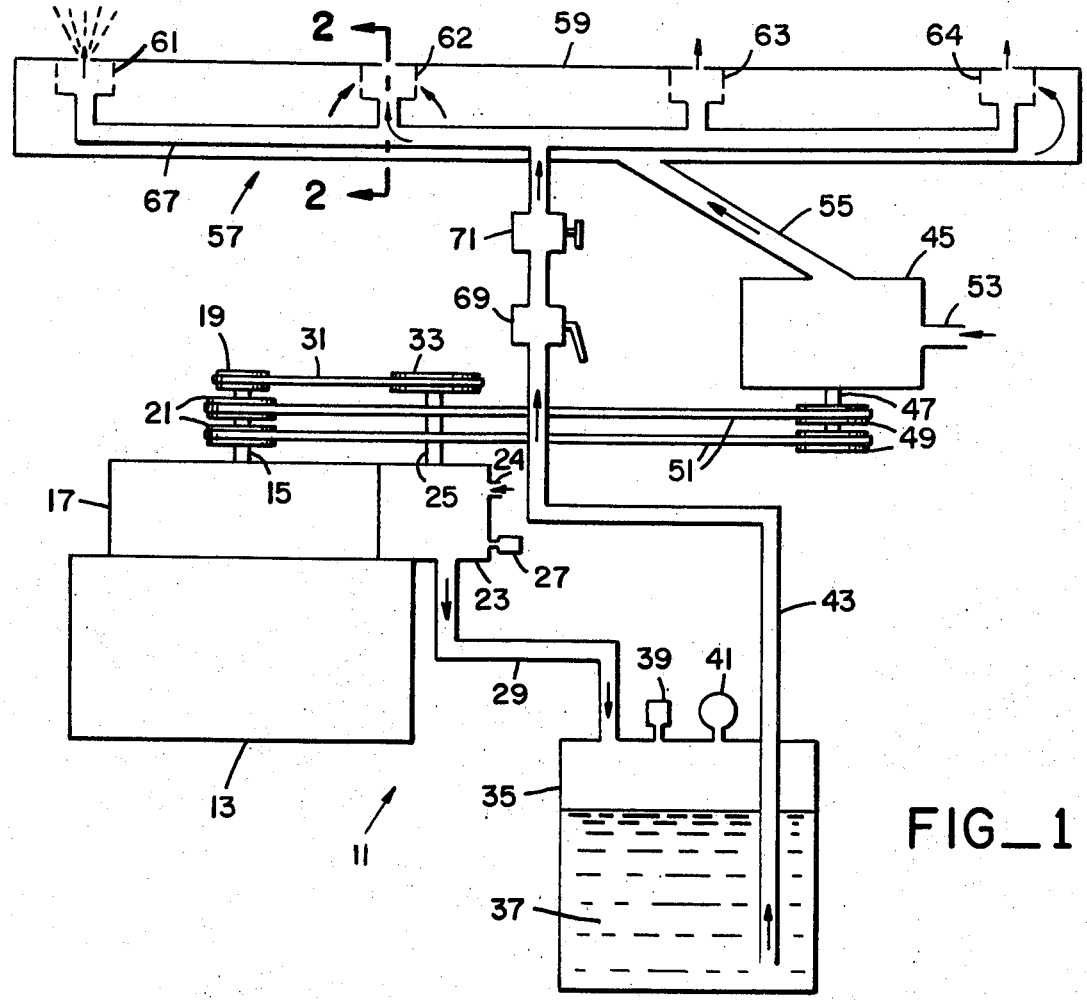
FIG_1
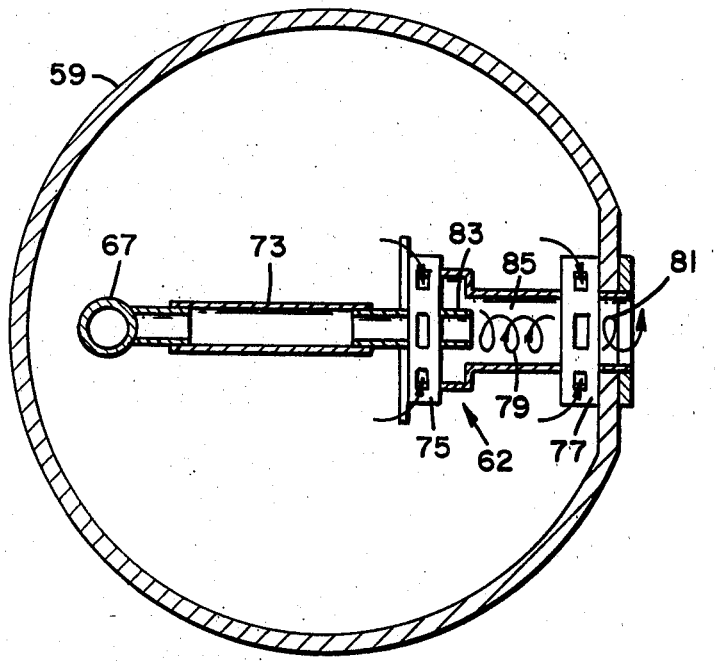
FIG_2

LOW VOLUME INSECTICIDE AEROSOL GENERATOR

This is a division of application Ser. No. 8,574, filed Feb. 4, 1970 by George S. STAINS and now U.S. Pat. No. 3,648,401.

The invention described herein may be manufactured and used by or for the Government of the United States of America for governmental purposes without the payment of any royalties thereon or therefor.

Much of the currently available insecticide dispensing equipment produces relatively large droplets which, for many purposes, is inefficient and ineffective. For example, 95 percent or more of the insecticide dispersed is in the droplet size range of from 50 to 400 microns and is largely wasted since the majority of it rapidly settles out by normal gravitational pull in a relatively short distance. It has been found with equipment of this type that the effective swath kill does not exceed about 600 feet. Much of this equipment utilizes exit velocity for dispersal of the droplets.

The present invention overcomes this difficulty by producing insecticide droplets of a size range of from about 5 microns to about 15 microns with a mass median diameter of less than 10 microns. The importance of this reduction in size will be apparent by comparing the number of droplets dispensed with conventional equipment to that dispensed by the equipment of the present invention. That is, in a milliliter of liquid there will be produced about 2,000,000 droplets of 100 micron diameter as compared to about 9,000,000,000 droplets of 6 microns diameter, or a 5,000 fold increase in number of 6 micron size droplets in the same amount of material. From this it can be seen that there is a much greater probability of an insect coming in contact with the smaller sized droplets as compared to the larger sized droplets. However, it has been found that there are certain limits as to how small the droplets can be made and still be effective. It has been found that the minimum size of droplet for flies and mosquitoes is about 3 to 5 microns. This is because the air current surrounding the insects will cause very small droplets to be carried by the air current around the insect and thereby not come in contact with the insect. With a 5 micron droplet it has been found that the momentum of the droplet will cause it to strike the insect, or the insect to strike it, without being carried around the insect by the air currents.

Another aspect of the present invention is the discovery that there is about 4 times as much insecticide, when using Naled-14 insecticide, for example, in a 5 micron droplet than is necessary to kill a fly or a mosquito. Therefore, a given volume of Naled-14 insecticide, for example, may be diluted with a liquid. It has been found that a non-volatile liquid has definite advantages for this purpose. This is because, if a volatile liquid were used, the 5 micron droplets would evaporate down to a smaller size and not have sufficient inertia or weight to penetrate the air stream surrounding the insects. Cottonseed oil has been found to be very effective for this purpose, not only because it is non-volatile, but because it is relatively inert and will not attack paints and the like with which it may come in contact in the target area. The practice of the present invention has provided swaths that kill flies and mosquitoes in excess of 2 miles from the source.

Briefly, the present invention comprises a method of producing an insecticide spray for killing insects with droplets in the size range of from about 5 microns to about 15 microns. The spray consists of an insecticide, such as Naled-14, diluted with a non-volatile liquid, such as cottonseed oil, in a ratio of 1 to 4 by volume. The equipment used to generate the spray comprises an engine driven air blower that supplies air at about 450 cubic feet per minute and at about 4 psi pressure to a manifold. The air manifold houses four air-liquid double vortical type nozzles which are surrounded by the high volume pressurized air. The engine also drives an air compressor pump that supplies air to pressurize the insecticide reservoir. The insecticide passes through a teflon and stainless steel conduit having a stainless steel cutoff valve and a stainless steel calibrated metering valve into the four air-liquid nozzles. The nozzle assembly, working on a double internal vortex type venturi principle, creates controlled turbulence. The pressurized air in the manifold enters the lower vortical disk creating a spiral pattern whirling through the central mixing chamber in a clockwise direction. A stream of liquid is injected at 30 to 60 psi through an orifice and into these two opposing air turbulences and is sheared off at the sharp edge of the forward end of the mixing chamber and thereby breaking up the insecticide into droplets having a size range of from about 5 to about 15 microns diameter.

Other objects, advantages and novel features of the invention will become apparent from the following detailed description of the invention when considered in conjunction with the accompanying drawings wherein:

FIG. 1 is a schematic diagram of the insecticide aerosol producing apparatus used in practicing the present invention; and FIG. 2 is an enlarged sectional view taken at 2—2 of FIG. 1.

In FIG. 1 is shown a schematic diagram of the aerosol generator 11 used to generate the aerosol spray in accordance with the present invention. Aerosol generator 11 includes a motor 13, such as a 14 HP four cycle gasoline engine, that drives output shaft 15 through clutch assembly 17. A clutch assembly is optional and normally would not be included if the engine is equipped with a starter/generator combination. Rigidly attached to output shaft 15 are drive pulley 19 and dual drive pulleys 21. Air compressor 23 includes an air inlet 24, an input shaft 25, a pressure relief valve 27 and an outlet conduit 29. A flexible friction belt 31 interconnects pulley 19 with pulley 33 that is connected to shaft 25 of the compressor.

The air from compressor 23 passes through conduit 29 to the upper region of reservoir 35 that contains the liquid insecticide 37 that is to be sprayed. Reservoir 35 includes a pressure relief valve 39, a pressure gauge 41 and an outlet conduit 43. A high flow rate air blower 45 includes an input shaft 47 having a dual drive pulley 49 attached thereto that is driven by motor 13 by dual friction belts 51. Blower 45 also includes an air inlet 53 and an air outlet conduit 55.

Aerosol generating manifold 57 includes an elongated manifold conduit 59, about 30 inches long, having a generally circular cross-section, about 5 inches in diameter, that is closed at both ends. Included within manifold conduit 59 are four nozzles 61, 62, 63, and 64 that are supplied with insecticide through conduit 67 which runs nearly the entire length of manifold conduit 59. Insecticide is supplied to conduit 67 from reservoir 35 through conduit 43 having cutoff valve 69 and metering valve 71. A high volume source of air is supplied to the interior region of manifold conduit 59 by conduit 55 wherein the air completely surrounds nozzles 61 through 64 and is used to mix with and atomize the insecticide.

In FIG. 2 is shown an enlarged sectional view taken at 2—2 of FIG. 1. Nozzle 62 is supplied insecticide from conduit 67 through flexible conduit 73. Nozzle 62 includes a first air inlet section 75 and a second air inlet section 77. Air inlet 75 includes curved vanes that cause the inlet air passing therethrough to form into a vortex 79 having a clockwise direction of rotation. Air inlet 77 includes curved vanes that cause the inlet air passing therethrough to form into a vortex 81 having a counterclockwise direction of rotation. The liquid insecticide passes through inlet conduit 83 and is then mixed in chamber 85 with clockwise rotating air vortex 79. The mixture of air and insecticide generated in chamber 85 is then mixed with the counterclocking air vortex 81 as it discharges from the end of chamber 85. This causes extreme agitation and shearing of the insecticide into droplets having a size range of from about 5 to about 15 microns diameter.

The operating parameters of the system as successfully employed are as follows: The pressure of the supply air within manifold conduit 59 is from about 3½ to about 4 psi above atmospheric pressure. The air flow rate through all four nozzles 61 through 64 is about 450 cubic feet per minute and is normally held constant. The flow rate of insecticide through all four nozzles is from about 0 to about 100 ounces per minute wherein the rate is controlled by metering valve 71 of FIG. 1. At lower insecticide flow rates the majority of the insecticide is formed into droplets having a size of order of about 5 microns and at high flow rates the majority of the insecticide has a droplet size that is of the order of about 15 microns. However, at both the low and high flow rates at least about 95 percent of the insecticide is formed into droplets within the 5 micron to 15 micron range. The insecticide is preferably diluted with a diluent such as cottonseed oil or one of the other vegetable oils. The ratio of diluent to insecticide is determined by the insecticide being used. An effective spray has been found to comprise Naled-14 diluted with cottonseed oil in a ration of 1 to 4 by volume. The use of non-volatile cottonseed oil prevents the diluent in the droplets from evaporating and causing the droplet to reduce in size and thereby prevents its loss of effectiveness by drifting around the insects in the air currents surround the insects. What is claimed is:

1. A method of producing a chemical spray wherein at least about 95 percent of the spray comprises droplets in the size range of from about 5 microns to about 15 microns in diameter consisting of:
   a. passing a high volume of air at an elevated pressure of approximately 4 psi at approximately ambient temperature into a mixing chamber;
   b. simultaneously directly introducing a liquid chemical solution into said mixing chamber; and
   c. creating a turbulance in the air flow through the chamber and thereby causing a breakup of the liquid solution prior to discharge from the mixing chamber.

2. The method of claim 1 wherein:
   a. said turbulance is created by generating an air vortex of the air passing through the mixing chamber.

3. The method of claim 2 wherein:
   a. said turbulance is intensified by creating a second air vortex having a direction of flow opposite to said first mentioned air vortex.

4. The method of claim 1 wherein:
   a. said spray is intended for the purpose of killing insects such as mosquitoes and flies; and
   b. said liquid chemical solution comprises 1 part by volume of active insecticide and 4 parts by volume of a non-volatile liquid.

5. The method of claim 4 wherein:
   a. said insecticide comprises NALED-14; and
   b. said non-volatile liquid comprises cottonseed oil.

* * * * *